(No Model.)
E. BOTTINI.
AIR COMPRESSING APPARATUS FOR VESSELS.
No. 604,962. Patented May 31, 1898.
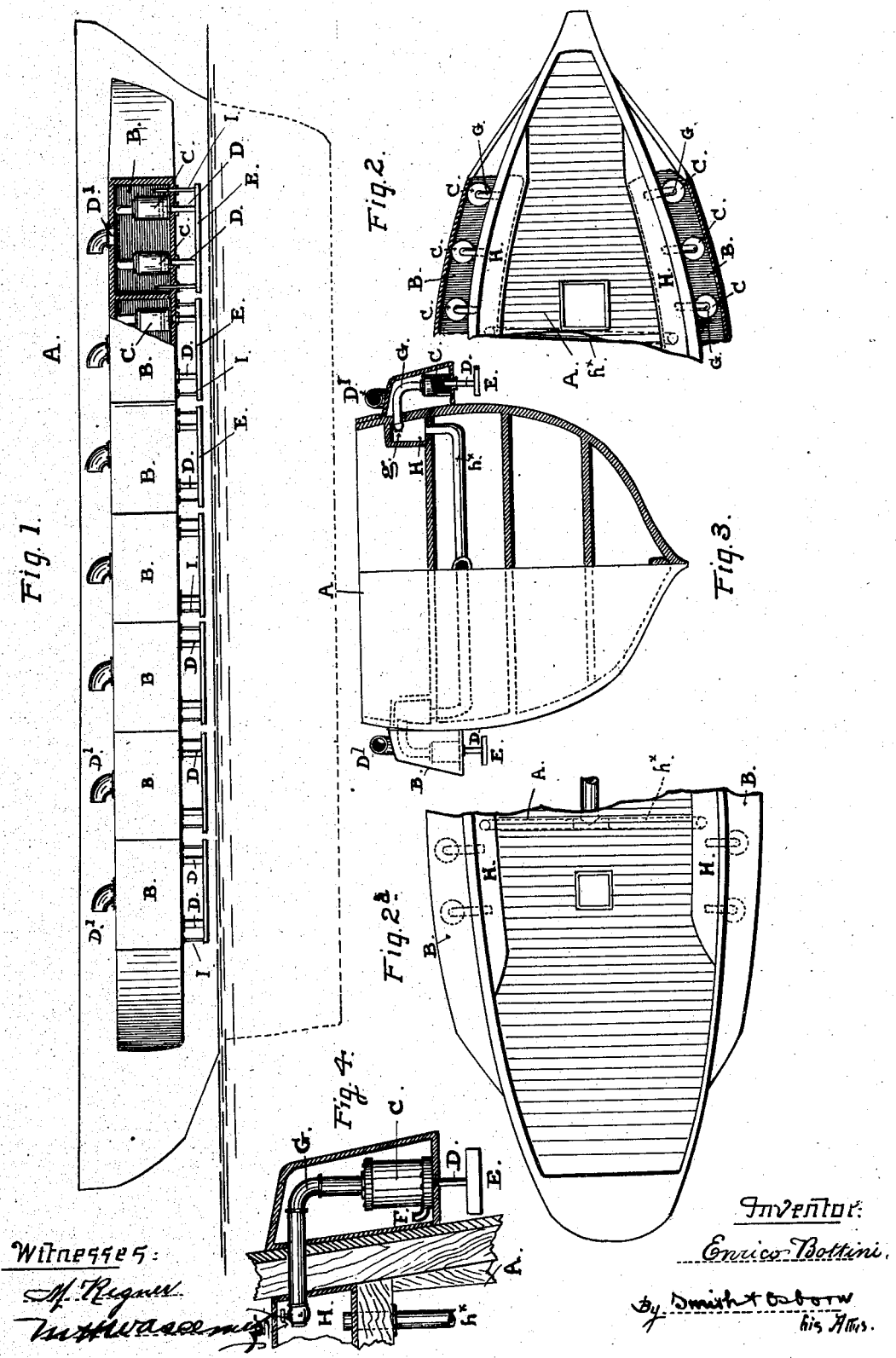

UNITED STATES PATENT OFFICE.

ENRICO BOTTINI, OF SAN FRANCISCO, CALIFORNIA.

AIR-COMPRESSING APPARATUS FOR VESSELS.

SPECIFICATION forming part of Letters Patent No. 604,962, dated May 31, 1898.

Application filed December 18, 1897. Serial No. 662,453. (No model.)

*To all whom it may concern:*

Be it known that I, ENRICO BOTTINI, a citizen of the United States, residing in the city and county of San Francisco, State of California, have invented certain new and useful Improvements in Air-Compressing Apparatus for Vessels, of which the following is a specification.

My invention relates to improvements in apparatus for compressing air by the combined force of the waves and the movements of a ship or vessel to which the same is applied; and the invention consists in certain novel construction of parts and combination of parts and their arrangement on a ship or vessel, as hereinafter described, and pointed out in the claims at the end of this specification. The same have for their object to produce and supply a body of compressed air by the combined force of the waves and the movements of the vessel in the water for the purpose of ventilation or to operate an auxiliary engine to do useful work on the vessel or to augment the motive power to propel the vessel.

The following description explains at length the nature of my said invention and the manner in which I proceed to construct, apply, and carry out the same, reference being had to the drawings that accompany and form a part of this specification.

In the said drawings, Figure 1 is an ideal representation of the hull of a vessel with my apparatus applied to and arranged on the same for operation. Fig. 2 is a plan or top view of the same at the bow, and Fig. 2ª a a portion of the hull at the stern. Fig. 3 is an end elevation with one-half in vertical transverse section. Fig. 4 is a detail sectional view, on an enlarged scale, of a pair of compression-pumps, their inclosing chamber, and the float beneath the chamber to which the pump-rods are connected.

A indicates the hull of a vessel on which this apparatus is arranged for operation.

B B are separate compartments or chambers arranged along the sides of the vessel above the load-line and either securely fixed on the outside of the hull or constructed integrally with the hull at the time of building.

C C are compressing-pumps fixed in each chamber, and D D are the piston-rods of the pumps.

E is a float located beneath the bottom of the chamber B, arranged so as to play perpendicularly or move up and down under the contact or impact of the waves against the bottom or under side of the float and having the piston-rods D D secured to it.

D' is an inlet in the top of the compartment B, through which air is drawn in by the pumps, and F is a suction or inlet valve in each pump-cylinder.

G is a tube leading from the pressure side of the pump into an air-tight tank or storage-compartment H inside the vessel.

Check-valves $g$ are placed on the outlet ends of the tubes G to prevent backward pressure of the air.

The tank H is carried around the inside of the gunwales or sides of the upper deck, so as to take the discharge-tubes G of all the pumps, and it is either carried around the ends of the vessel at the stem or the stern, or the tank on one side is connected with that on the other side of the hull by one or more pipes $h^\times$, as indicated in Figs. 2 and 2ª, and from these pipes other conductors are laid to different points for carrying the air from the storage-compartments to parts of the vessel where it is required for use. By a single conductor these pipes can be connected with a compressed-air engine in cases where sufficient force or pressure is generated and stored in the tanks to work an engine of that description either to perform work auxiliary to the main engine or to aid in the propulsion of the vessel where the same is propelled by power.

The floats E, through the medium of which the lifting force or power of the water is applied to work the pumps, are guided and maintained in working position by the piston-rods in the perpendicular movements; but additional guides are employed when required for the purpose of insuring a perpendicular lifting in the same plane under any irregular or variable pressure of the water against one end over the other end of the float. These additional guides are composed of rods $l$, fixed to the float near the ends and working upward through guiding-apertures in the bottom of the compartment B, as indicated in Fig. 1.

The floats E are weighted, so as to descend as the force of the waves or water acting on them is withdrawn from against their bottom surface.

As thus constructed and arranged for operation, the rising and descending movements of the floats at the sides of the vessel under the impact of the waves against them from beneath and the rolling motion of the vessel is caused to work the pumps in the two sets of compartments B, and the air drawn in through the openings in the top of these compartments is forced by the pumps into the compartments H, which I have termed the 'storage-tanks."

Having thus fully described my invention, what I claim as new, and desire to secure by Letters Patent, is—

1. The combination in and with a vessel, of air-receiving compartments arranged exteriorly on the hull and communicating with the atmosphere; air-pumps in said compartments provided with inlet-ports and pressure or discharge ports and having piston-rods extending through the bottoms of the compartments; floats beneath said compartments having rising-and-falling movements under the impact of the waves from beneath, said floats being connected to the piston-rods; storage-tanks within the vessel and air-conductors connecting the discharge-ports of the pumps with said tanks, and check-valves in said connections, constructed for operation as set forth.

2. In an air-compressing apparatus for vessels, the combination of a compartment located exteriorly of the hull having communication with the atmosphere; an air-pump in said compartment provided with inlet-ports and discharge-ports; a storage-tank; an air-conductor connecting the discharge-port of the pump with the storage-tank and having a check-valve; and a float beneath the pump-containing compartments connected to the piston-rods of the pump, and adapted to rise and fall under the impact of the waves acting against said float from beneath, substantially as described.

In testimony that I claim the foregoing I have hereunto set my hand and seal.

ENRICO BOTTINI. [L. S.]

Witnesses:
 C. W. M. SMITH,
 CHAS. E. KELLY.